US009373963B2

(12) United States Patent
Kuznetsov (10) Patent No.: US 9,373,963 B2
(45) Date of Patent: Jun. 21, 2016

(54) ENERGY TRANSFER AND STORAGE APPARATUS FOR DELIVERY OF PULSED POWER

(71) Applicant: Raytheon Company, Waltham, MA (US)

(72) Inventor: Stephen B. Kuznetsov, Marlborough, MA (US)

(73) Assignee: Raytheon Company, Waltham, MA (US)

(*) Notice: Subject to any disclaimer, the term of this patent is extended or adjusted under 35 U.S.C. 154(b) by 467 days.

(21) Appl. No.: 13/902,621

(22) Filed: May 24, 2013

(65) Prior Publication Data

US 2014/0346868 A1 Nov. 27, 2014

(51) Int. Cl.
*H02J 1/10* (2006.01)
*H02J 3/38* (2006.01)
*H02J 7/34* (2006.01)
*H02J 4/00* (2006.01)
*H02J 1/00* (2006.01)
*H02J 3/28* (2006.01)
*H02J 3/30* (2006.01)
*H02J 3/32* (2006.01)

(52) U.S. Cl.
CPC ... *H02J 4/00* (2013.01); *H02J 1/00* (2013.01); *H02J 3/28* (2013.01); *H02J 3/30* (2013.01); *H02J 3/32* (2013.01); *H02J 2001/002* (2013.01); *Y02E 60/16* (2013.01); *Y10T 307/305* (2015.04)

(58) Field of Classification Search
CPC .............. H02J 4/00; H02J 1/00; H02J 3/28; H02J 3/32; H02J 2001/002; H02J 3/30; Y10T 7/305

USPC ........................................................ 307/106
See application file for complete search history.

(56) References Cited

U.S. PATENT DOCUMENTS

| 4,896,063 | A | * | 1/1990 | Roberts ................. H02K 17/28 310/184 |
| 4,926,107 | A | | 5/1990 | Pinson |
| 4,935,708 | A | * | 6/1990 | Weldon .................. H02K 39/00 123/3 |
| 5,611,505 | A | | 3/1997 | Smay |
| 6,118,678 | A | | 9/2000 | Limpaecher et al. |
| 6,388,347 | B1 | | 5/2002 | Blake et al. |
| 6,667,599 | B2 | * | 12/2003 | Stone ....................... H02J 1/08 320/112 |
| 7,659,700 | B2 | | 2/2010 | Holveck et al. |
| 7,969,123 | B2 | | 6/2011 | Crane |
| 8,080,900 | B2 | | 12/2011 | Corhodzic et al. |
| 8,350,519 | B2 | | 1/2013 | Brantner et al. |
| 2003/0155967 | A1 | * | 8/2003 | Fujimoto ................ H03F 3/005 330/9 |

(Continued)

*Primary Examiner* — Jared Fureman
*Assistant Examiner* — Esayas Yeshaw (57) ABSTRACT

A method and system supply pulsed power. The system includes an inertial energy storage device configured to store inertial energy and an electrochemical energy storage system configured to store electrochemical energy. The system includes a bidirectional energy transfer system. The energy transfer system is configured to receive energy from an energy source. The energy transfer system is configured to transfer at least a portion of the received source energy to the inertial energy storage device. The energy transfer system is configured to transfer at least a portion of the received energy in the inertial energy storage device to the electrochemical energy storage system while controlling a rate at which energy is transferred to the electrochemical energy storage system based on a prescribed charging rate associated with the electrochemical energy storage system. Additionally, the energy transfer system is configured to supply power to one or more loads using the stored energy.

23 Claims, 9 Drawing Sheets

(56) References Cited

U.S. PATENT DOCUMENTS

| | | | |
|---|---|---|---|
| 2005/0012395 A1* | 1/2005 | Eckroad | H02J 3/16 307/44 |
| 2005/0192713 A1* | 9/2005 | Weik | G06Q 50/188 700/295 |
| 2005/0266300 A1* | 12/2005 | Lamoreux | H01M 2/202 429/50 |
| 2008/0055940 A1* | 3/2008 | Lawson | H02M 1/10 363/16 |
| 2013/0009477 A1 | 1/2013 | DeLattre et al. | |
| 2013/0249287 A1* | 9/2013 | Feuerstack | B60L 11/1866 307/20 |
| 2013/0293163 A1* | 11/2013 | Flett | H02P 27/08 318/139 |
| 2014/0028031 A1* | 1/2014 | Tsuchiya | B60K 6/30 290/38 B |

\* cited by examiner

ENERGY TRANSFER AND STORAGE APPARATUS FOR DELIVERY OF PULSED POWER

TECHNICAL FIELD

The present disclosure is directed in general to energy transfer and storage and, more specifically, to delivery of large pulses of power using inertial and/or electrochemical energy storage.

BACKGROUND

Rotating energy storage and conversion machines in the multi-megawatt range have been used to store and transfer power. Use of such energy storage and conversion machines has been limited to Scherbius-type electrical machines or direct current (DC) machines as used in railway kinetic energy storage devices. Both of these applications deal with slowly changing loads. Current energy storage and conversion machines with conventional inertial storage devices are not capable of supplying fast pulse power to loads. Additionally, current energy storage and conversion machines have not been developed to augment or utilize high-density battery charging.

Scherbius-type electrical machines for large scale energy storage applications are generally described in *Rotating Converters for Interconnecting Power Systems*, Brown Boveri Review, August 1964, which is incorporated by reference herein. A general overview of pulse forming networks is described in W. J. Sarjeant & R. E. Dollinger, High Power Electronics (TAB Books 1989), which is incorporated by reference herein. General cycloconverters, phase delay rectifiers, and alternating current (AC) link converters are described in B. R. Pelly, Thyristor Phase Controlled Converters and Cycloconverters, (John Wiley & Sons 1971), which is incorporated by reference herein. AC Link converters are described in U.S. Pat. Nos. 6,118,678 and 7,659,700, both of which are incorporated by reference herein.

SUMMARY

The present disclosure provides energy transfer and storage for delivery of pulsed power. In various embodiments, a pulse power supply system is provided. The system includes an inertial energy storage device configured to store inertial energy, an electrochemical energy storage system configured to store electrochemical energy, and a bidirectional energy transfer system. The bidirectional energy transfer system is configured to receive energy from one or more input power sources and to transfer at least a portion of the received energy to the inertial energy storage device and subsequently to the electrochemical energy storage system. The bidirectional energy transfer system is also configured to transfer at least a portion of the inertial energy to the electrochemical energy storage system while controlling a rate at which energy is transferred to the electrochemical energy storage system based on a prescribed charging rate associated with the electrochemical energy storage system. Additionally, the bidirectional energy transfer system is configured to supply pulses of power to one or more loads using the stored energy.

In one or more of the above described embodiments, the bidirectional energy transfer system may transfer energy that is unused by the one or more loads to the inertial energy storage device and, after a time delay, transfer a portion of energy from the inertial energy storage device to the electrochemical energy storage system. The inertial storage device is connected to the rotating electrical machinery for conversion of kinetic energy to electrical power and vice versa.

In one or more of the above described embodiments, the bidirectional energy transfer system may include a synchronous modulator bidirectional electrical machine. The synchronous modulator electrical machine may include a tertiary stator winding for machine excitation and voltage control having an input from a polyphase pulsed excitation system.

In various embodiments, a system is provided. The system includes an inertial energy storage device configured to store inertial energy, an electrochemical energy storage system configured to store electrochemical energy, a bidirectional energy transfer system, and a load. The bidirectional energy transfer system is configured to receive energy from an energy source and transfer at least a portion of the received energy to the inertial energy storage device. The bidirectional energy transfer system is also configured to transfer at least a portion of the received energy to the electrochemical energy storage system while controlling a rate at which energy is transferred to the electrochemical energy storage system based on a prescribed charging rate associated with the electrochemical energy storage system. Additionally, the bidirectional energy transfer system is configured to supply power to one or more loads using the stored energy form either electrochemical or inertial energy source or both sources simultaneously.

In various embodiments, a method for supplying pulsed power is provided. The method includes receiving energy from an energy source. The method includes transferring at least a portion of the received energy to an inertial energy storage device to store inertial energy, with associated electrical machinery for power conversion and control. The method includes transferring at least a portion of the received energy to an electrochemical energy storage system while controlling a rate at which energy is transferred based on a prescribed charging rate associated with the electrochemical energy storage system to store electrochemical energy. Additionally, the method includes supplying pulses of power to one or more loads using the stored energy from either one or multiple storage devices.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Embodiments of the preset disclosure provide transfer and conditioning of large blocks of power with fast rise times, high voltages, and high currents. In various embodiments, the load device may be a pulsed DC or pulsed AC subsystem. For example, and without limitation, the load device may be a railgun, high energy laser, or high power radar system that has an intermittent duty or a specific repetition rate. The energy source may have inherent limitations on transient and intermittent pulse loading. For example, without limitation, the energy source may be a continuous output AC power system, a DC power grid, or a connection to a turbine generator set. Embodiments of the present disclosure apply new techniques for modulating electrochemical energy storage, such as, for example, without limitation, high density lithium ion batteries or a capacitor array, and combine inertial storage with electrochemical storage to produce desired output power characteristics. Embodiments of the present disclosure recognize that current electrochemical energy storage components may have an inherent limitation on the recharge rate. Thus, embodiments of the present disclosure provide a mechanism for interfacing a high-capacity electrochemical storage with an inertial storage system with multiple input and output ports to meet requirements of demanding pulsed power charge and recharge cycles.

Figure 1:
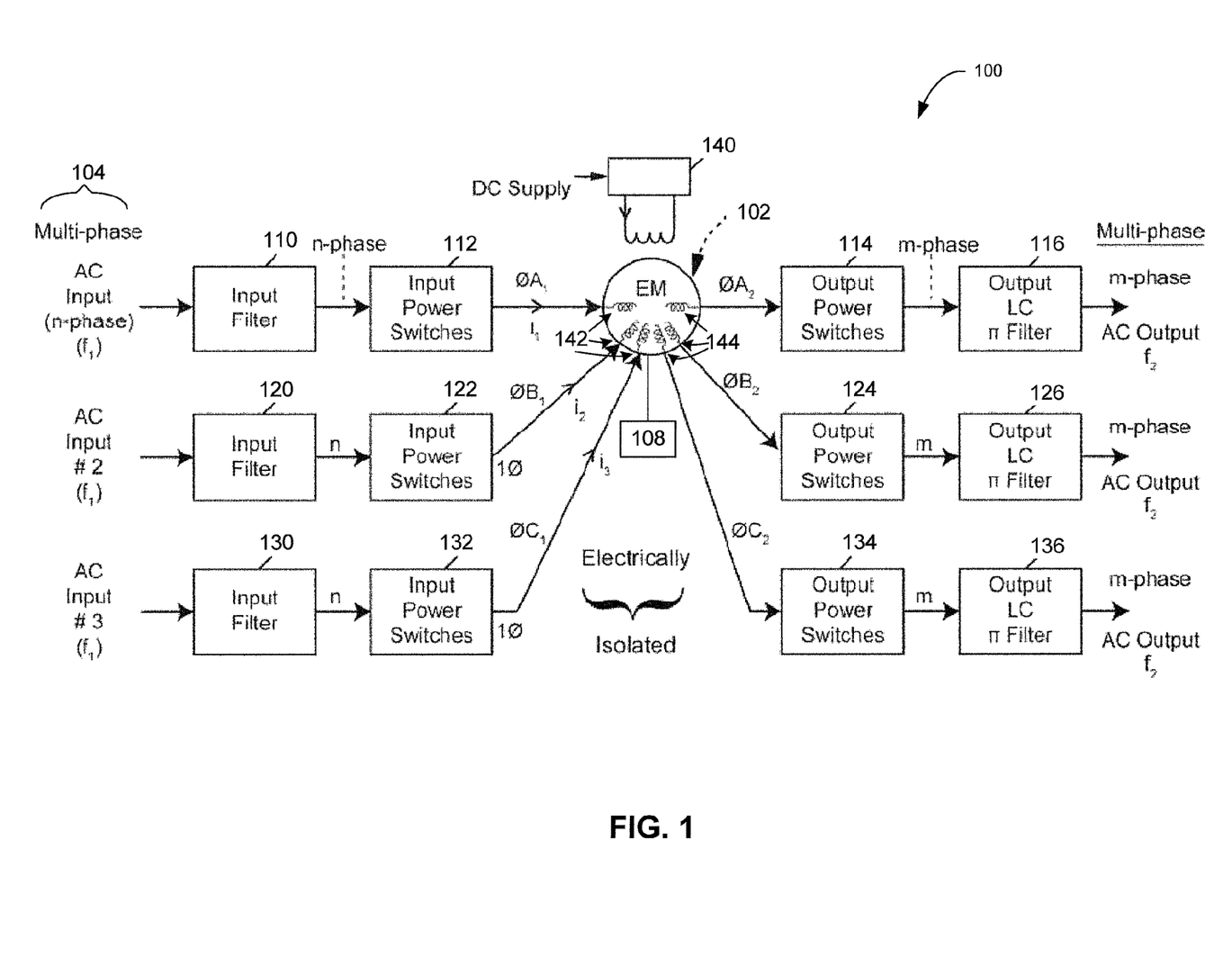
FIG. 1 illustrates a block diagram of a bidirectional energy transfer system in accordance with an illustrative embodiment of the present disclosure.

FIG. 1 illustrates a block diagram of a bidirectional energy transfer system 100 in accordance with an illustrative embodiment of the present disclosure. For example, the system 100 may be an AC link power conversion system with all naturally-commutated switching devices. The system 100 includes an electric machine (EM) 102, such as a synchronous modulator or similar electrical machine, for inertial energy storage or energy transfer in a bidirectional power flow system. At power levels in the megawatt and giga-watt range, use of power switching devices that are naturally commutated rather than force commutated may be essential for several reasons including reliability and minimal cost. Natural commutation of high-power circuitry may also reduce the electromagnetic radiation from the power converter, which may be useful in shipboard or military applications.

As illustrated, the system 100 may receive energy from multiple AC power input sources 104, which, for example, may be derived from multiple turbine generator sets or inputs from different zones on a ship with a zonal distribution system (ZDS). Each input source 104 may be at a different frequency (e.g., f1, f2, or f3) or voltage level. The input sources 104 may include "n" number of input sources 104. Each power input source 104 may be a polyphase AC source. The system 100 includes input filters 110, 120, and 130 to filter the input. The system 100 then feeds the filtered input power to input power switching networks 112, 122, and 132, which create a set of single phase outputs labeled $A_1$, $B_1$, and $C_1$. These single phase outputs may all have the same frequency (e.g., f4 at 120 or 60 degrees displaced in phase) to create a 3-phase or 6-phase polyphase system. The respective currents (i.e., $i_1$, $i_2$, and $i_3$) are inputs to the primary stator windings 142 of the EM 102.

The EM 102 may be a synchronous electrical machine with a wound DC field winding and has mechanically attached inertial energy storage device 108 for inertial energy storage with rotating energy $E_r$. The EM 102 is operated in a variable speed mode by input frequency regulation depending on the level of energy to be stored in the inertial energy storage device 108. The field excitation of the EM 102 is adjustable by automatic regulator action and which allows the EM 102 to deliver or absorb real power and also to deliver or absorb reactive power from the input. The response time of the EM 102 to deliver or absorb energy is on the order of cycles (e.g., 6 cycles) which is, for example, 15 milliseconds on a 400 Hz machine and is much faster than an electrochemical cell (e.g., a battery) in absorbing (i.e., recharging) energy.

The energy transfer system 100 includes multi-port and multi-phase output power. As illustrated, EM 102 includes multiple windings which allow multiple output frequencies. In this embodiment, the EM 102 uses a rotor field circuit 140 having a separate power supply. In other embodiments, the EM 102 may also be a permanent magnet electrical machine. However, the permanent magnet configuration may present less flexibility than the wound-field synchronous machine configuration.

In various embodiments of the present disclosure, the EM 102 includes a second set of stator windings (i.e., secondary windings 144), which are electrically isolated from the primary windings 142. The secondary windings 144 are magnetically coupled to the primary windings 142 by rotor action and a minor amount of stator leakage flux. These secondary windings 144 are single phase windings and are each connected to separate output power switches 114, 124, and 134 creating an m-phase polyphase system. The input number of phases "n" is distinct and different from the output number of phases (herein "m"). Additionally, the voltage level of the output phases is independent of the input voltage level. Each output phase has its own π-filter inductive-capacitive network 116, 126, and 136. When all single phase branches are combined, these networks 116, 126, and 136 produce a polyphase set of currents which can be balanced and filtered. Using two separate wavelengths (or winding pole pitches) in the EM 102, the secondary windings 144 have an output frequency $f_2$ which is higher than the input frequency $f_1$, for example, by a factor of 2:1 or greater, thereby allowing the output filtering to be more efficient and compact. Further increase in output frequency may be provided, if needed, by the output power switches 114-134 which, acting as an inverter, may establish an arbitrarily higher output frequency.

In this embodiment, the energy transfer system 100 is a complete AC to AC conversion system with high electrical isolation from input to output and bidirectional power flow in accordance with various embodiments of the present disclosure. In one illustrative example, the electrical impulse isolation may be 75 kV or higher from the input to the output side in an electrical machine that has a normal phase winding voltage of 4160 Volts. This high level of isolation may be a benefit in pulsed power systems if a fault mode exists, for example, where the pulsed load may have a surge voltage as high as 60 kV peak, the input source is either 13.8 kV (or 4.16 kV), and the two potentials cannot be mixed even under fault conditions for any duration of time. The energy rating of the inertial energy storage device 108 is set in consideration of the power rating of the EM 102 and determined by the overall performance of the system 100. The energy rating "E" is based upon the output apparent power rating "S" of the electrical machine and may be computed according to equation 1 below:

$$E=H*S \qquad \text{[Equation 1]}$$

where E is the energy rating expressed in kilowatt-seconds, H is the inertia constant for the inertial energy storage device 108, and S is calculated in kVA. The H constant may be calculated by the manufacturer based on rotor mass W (in pounds), the radius R (in feet), and the speed in rotations per minutes (rpm) according to equation 2 below.

$$H=0.231 WR^2 (\text{rpm})^2 * 10^{-6}/kVA \qquad \text{[Equation 2]}$$

The H constant may be increased by the addition of external inertia "$WR^2$" to the rotor of the inertial energy storage device 108. The stored energy of the inertial energy storage device 108 may need to exceed, at a minimum, the commutation energy associated with reverse recovery energy of the power switches for which there may be no static capacitors in this system to commutate switching devices. A large portion of the useable amount of stored energy rating may be derived from a requirement to support an average load "MWe" for a period of time "Te", which may be calculated according to equation 3 below.

$$E=MWe*Te \qquad \text{[Equation 3]}$$

In a most basic control scheme, the inertial energy storage device 108 is charged to energy level $E_1$ from an input line at an average power input of $MW_1$ over time period "T1." The reserve energy retained by the machine inertia is $KE_1$, the rotational energy losses during the discharge cycle are EL, and the average output power in a pulse is $MW_2$ over time period T2. The relationship between these components may be expressed according to equation 4 below.

$$E_1=MW_1*T1=KE_1+EL+MW_2*T2 \qquad \text{[Equation 4]}$$

In regard to high power switching, natural commutation by the counter EMF derived from the windings in the EM 102 may be preferential for electronic commutation of large power switching devices. The counter EMF (C-EMF) is controlled by three parameters: machine shaft speed, field excitation (or flux), and particulars of the stator winding of the ME 102, such as turns per pole. Field excitation is the fastest control variable commonly available having a millisecond response time followed by the speed control; the winding parameters are fixed for each particular winding. However, since the EM 102 has at least two distinct winding arrangements, the output windings may, for example, have a higher C-EMF than the input winding C-EMF. Despite differences in tetminal voltages and C-EMF, the input windings and output windings may have approximately the same L/R time constant independent of voltage level since each winding may occupy similar shaped stator slots, and both input and output windings may use copper windings with a similar cross section of copper per slot.

Figure 2:
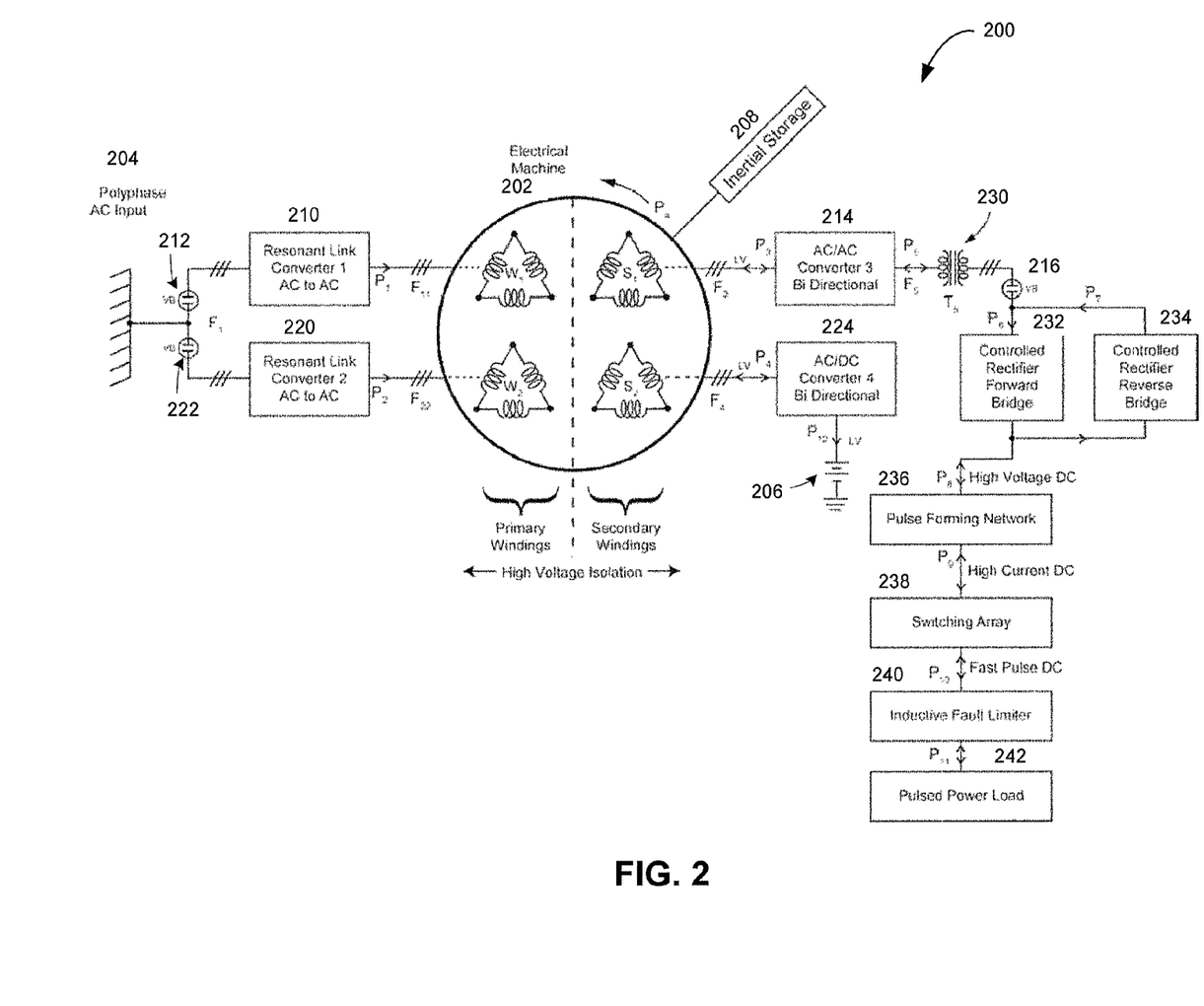
FIG. 2 illustrates a system capable of providing high repetition rate, high voltage pulsed power in accordance with various embodiments of the present disclosure.

FIG. 2 illustrates a system 200 capable of providing high repetition rate, high voltage pulsed power in accordance with various embodiments of the present disclosure. For example, the system 200 may be an example of one implementation of the system 100 in FIG. 1. As illustrated, the system 200 includes two power converters 210 and 220, which are resonant link bi-directional power converters using, for example, thyristor switches. The power converters 210 and 220 have an input or line frequency $F_1$ and output frequency $F_{11}$ and $F_{22}$, respectively. In various embodiments, $F_{11}$ and $F_{22}$ are preferably higher in frequency than $F_1$ and provide high efficiency conversion and compact output filtering. Power converters 210 and 220 include internal circuitry to adjust the input power factor to be unity under normal load conditions. In a baseline case, power outputs $P_1$ and $P_2$ may be identical and controlled according to how quickly the system 200 determines to charge the EM 202 and ramp up or down the speed of the inertial energy storage device 208. In one illustrative example, if the EM 202 having 60 MJ rating is commanded to ramp-up to full speed in 60 seconds, the input powers $P_1$ and $P_2$ may need to be 500 kW each or 1000 kW total. Vacuum breakers (VB) 212 and 222 may be included to isolate each converter 210 and 220, respectively, in the event of failure or maintenance.

When the input power supply is powering the EM 202 in a startup mode, the input energy $E_s$ is transferred to the machine accelerating power "Pa" and, during this duration, the output frequencies "$F_3$" and "$F_4$" are in a constant state of change and increase from zero to maximum frequencies $F_{3m}$ and $F_{4m}$. Winding $S_2$ in the EM 202 provides a path to charge an electrochemical energy storage system 206 (e.g., a battery bank or capacitor array) through an AC/DC converter 224, which can accept variable frequency input power at $F_4$ and convert the received power to a regulated DC output as $P_{12}$, which may be a lower voltage than is directly supplied to the electrochemical energy storage system 206. However, a prescribed charging rate to electrochemical energy storage system 206 may need to be controlled and/or limited to prevent overheating and potential failure of the electrochemical energy storage system 206 (e.g., battery overheating or cell failure). The prescribed charging rate for the electrochemical energy storage system 206 may be, for example, one-tenth (C/10) of the charging rate of the inertial energy storage device 208. The EM 202 performs functions of a charging regulator and absorbs and/or limits current to avoid overcharging the electrochemical energy storage system 206. For example, the EM 202 may control a rate at which regenerated energy from the load circuit is supplied to the electrochemical energy storage system 206 when the load energy storage must be unloaded in the event of an aborted load energy usage event.

Additionally, an output from the EM 202 from winding $S_1$ supplies power to AC/AC converter 214. The output frequency $F_5$ of the converter 214 may be higher or lower than $F_3$. A transformer $T_5$ 230 transforms the voltage level of the output power at $F_5$, which is then rectified by controlled rectifier bridges 232 and 234 before reaching the pulse forming network (PFN) 236, switching array 238, and inductive fault limiter 240 prior to reaching pulsed power load 242, as described in greater detail below.

In this illustrative embodiment, there are four principal energy components: 1) source energy "$E_s$" from an input energy source 204 (e.g., a turbine generator); 2) inertial energy "$E_r$" stored in the inertial energy storage device 208; 3) electrochemical energy "$E_b$" stored in the electrochemical energy storage system 206; and 4) stored energy "$E_p$" in PFN 236. In various embodiments, $E_s$ may be the source of input energy, but the power output of $E_s$ may be relatively low compared with the demands of the load. Additionally, the duration of the input energy may be limited to initial charge energy "$E_o$". Initially, $E_s$ charges the EM 202 from zero to an energy level "$E_r$". After reaching a maximum inertial stored energy level "$E_{rm}$", the $E_s$ may be used to charge the electrochemical energy storage system 206 to a maximum level "$E_{bm}$" and then shut off, leaving the input energy source 204 without an active load during the load pulsing events. Unloading the input energy source 204 during active mode may be desirable from a reliability standpoint.

In the high intensity repetition rate mode, the PFN 236 is charged from power originating in the EM 202 at frequency $F_3$ and power $P_3$ input to the AC/AC converter 214, which converts the power to a higher frequency $F_5$ for which $P_5$ may be approximately equal to $P_3$ (e.g., may differ by losses of the converter 214). The transformer $T_5$ 230 may be a high frequency polyphase transformer that is preferably a step-up transformer which is connected to vacuum breaker (VB) 216 and power is routed as $P_6$ to the controlled forward bridge rectifier 232. High voltage DC is produced at the output of the bridge 232 which is directed as $P_8$ to either one PFN 236 or an array of PFNs 236 connected in parallel. The PFNs 236 are capable of storing large amounts of energy "$E_p$". The PFN energy $E_p$ may be a fraction of the total stored by the EM 202. As a result, $E_r$ can provide multiple charging cycles for the PFN 236 separated by multiple discharge cycles. After each discharge cycle, the speed of the EM 202 is gradually reduced from full speed to intermediate speed points until a lower threshold speed 70% or the half energy point for the inertial energy storage device 208) is reached. Once the lower threshold speed is reached, then the input energy source 204 is reconnected to the stator of the EM 202 to accelerate the inertial energy storage device 208 up to full speed and inertial energy full storage level.

In one mode of operation, if the repetition time between charge cycles of the PFN 236 is relatively small, the electrochemical energy storage system 206 may need to wait until a first string of output pulses is delivered before $E_b$ is used to boost the speed of the EM 202. This mode of operation may be a "rapid fire" mode where the electrochemical energy storage system 206 battery supplements the EM 202 when a lower dynamic threshold speed (LDTS), is such as 70%, is reached. This mode assumes that there is no more contribution of energy from the input energy source 204.

In a second mode of operation, if there is sufficient time in between PFN output load pulses to allow the electrochemical energy storage system 206 to increase the inertial energy corresponding to the amount of energy used in each load output pulse, then the EM 202 may be able to retain a speed between 90% and 100% of the maximum speed, which is desirable. After some number of load output pulses, the voltage of the electrochemical energy storage system 206 decreases to some point where any further energy must be derived from the EM 202 until the speed of the EM 202 drops to a predetermined minimum threshold speed (MTS), for example, such as 40% of base speed or 16% of peak energy. Again, this mode assumes there is no more contribution input energy source 204 until both the electrochemical energy storage system 206 and the EM 202 reach minimum acceptable energy levels.

In this illustrative embodiment, the forward rectifier bridge 232 charges the PFN 236 through power input $P_8$. For example, the forward rectifier bridge 232 may be a polyphase input bridge employing a 12 pulse or 24 pulse rectifier circuit utilizing thyristor switches. Multiple thyristors may be stacked in series to attain the proper voltage levels. The voltage output and charging rate of the forward rectifier bridge 232 may be precisely regulated, but the power flow may only be in the direction illustrated. Either of the following two scenarios may occur. In one scenario, the switching array 238 proceeds to discharge the PFN 236 and in so doing may transform the high voltage DC into high current DC. This DC current has a fast rise time after the switching array 238 is transformed to a higher peak power level $P_{10}$ and proceeds through the inductive fault limiter 240. If a system fault is detected, the inductive fault limiter 240 may attenuate the output current of the switching array 238 (possibly in the mega-amps at this stage) to a lower level; otherwise, the high-current fast-pulse proceeds to the load 242 or array of load modules 242. The load array 242 may be inductive, resistive, or both and may incorporate electromechanical actuation or a launcher load.

In a second scenario, the switching array 238 holds off, curtails, or directs the output pulse. For example, the load 242 may no longer need the output pulse. The energy stored in the PFN 236 is large, for example, on the order of mega-joules. This energy may need to be immediately diverted to another energy sink within seconds or milliseconds. In this scenario, the forward rectifier bridge 232 shuts off, and the reverse rectifier bridge 234 is gated ON to generate power frequency $f_5$ and allows power to flow backwards through $P_7$ and then follows a path through VB 216, transformer $T_5$ 230, and then into the power converter 214. The converter 214 transforms the regenerated power at frequency $F_5$ (which may be at a lower frequency than required by the EM 202 for power matching) to a frequency $F_3$ (which may be higher than $F_5$) so that the EM 202 may be charged in a constant flux mode which needs a constant volts per hertz (V/Hz) ratio to be applied. The frequency $F_3$ may need to be proportional to the speed of the EM 202. In one example, if the reverse rectifier bridge 234 receives a 15 kV DC input from the PFN 236, the reverse rectifier bridge 234 may convert this input to 60 Hz polyphase power (3, 6, or 12 phase) output at $P_7$ at about 11 kV rms. The transformer 230 transforms this 11 kV down to about 4 kV, which is appropriate for both the EM 202 and converter 214. Additionally, the AC converter 214 increases the $F_5$ frequency from 60 Hz to 400 Hz or greater to operate the EM 202 in a regenerative mode. If the EM 202 is initially at a low speed, such as 40% of maximum speed, frequency $F_3$ may need to start at 400 Hz and then increase within a matter of seconds up to a final frequency of 1000 Hz.

The accelerating power of the EM 202 "$P_a$" is equal to the input energy derived either from the input energy source 204 or from the diverted and regenerated energy. The accelerating power determines how fast the EM 202 changes speed and the output/input frequency. In one illustrative example, if the regenerated power is 1000 kW, the inertial stored energy of the EM 202 is 4.3 kg-m-sec$^2$, and the machine speed is to be raised by a maximum 3000 rpm per event, the EM 202 can absorb this energy in 3.73 seconds, which is preferential from the aspect of retaining life and safety of the capacitor bank in the PFN 236. In another illustrative example, if the EM 202 is idling at 6000 rpm but has a 30,000 rpm maximum operational speed, the level of repetitive regenerative flow of energy with a speed ramp of 3000 rpm/event would be allowed 8 times. Embodiments of the present disclosure provide this arrangement and configuration to allow the PFN 236 to quickly discharge into the EM 202 without damage to the EM 202. On the other hand, if this same energy were to be regenerated quickly (e.g., less than 10 seconds time) into an electrochemical cell of the electrochemical energy storage system 206, resulting damage would occur rendering the cell inoperable.

The system 200 also includes the switching array 238 for changing medium rise-time DC pulses with power level $P_9$ to fast rise-time DC pulses of power level $P_{10}$. For example, the switching array may be composed of Integrated Gate Commutated Thyristors (IGCTs), Insulated Gate Bipolar Transistors (IGBTs), or similar high current devices. After the switching array 238, the inductive fault limiter 240 limits fault currents to a threshold value by inductance insertion prior to supplying power $P_{11}$ to the pulsed power load 242.

Once the PFN 236 is discharged through regenerative action into the EM 202, a controller for the system 200 determines whether to retain the stored energy as kinetic energy $E_r$ or transfer a portion of the energy from the PFN 236 to the electrochemical energy storage system 206. In various embodiments, the energy "$E_p$" that is not used by the load 242 is transferred from the EM 202 to the electrochemical energy storage system 206 at a calculated safe transfer rate (e.g. 2C), which avoids boiling or highly-stressed thermal conditions on the electrochemical energy storage system 206. This charging operation may take a longer period of time but provides safe system operation. In terms of the repetition rate of the system 200, if the EM 202 has the ability to store energy from several successive load non-usage events, the system 200 has the flexibility as to when to transfer the unused energy to the electrochemical energy storage system 206. The system 200 may always have the ability to fully recover regenerative energy as long as the input energy source 204 is limited to only providing energy prior to a string of discharges.

Figure 3:
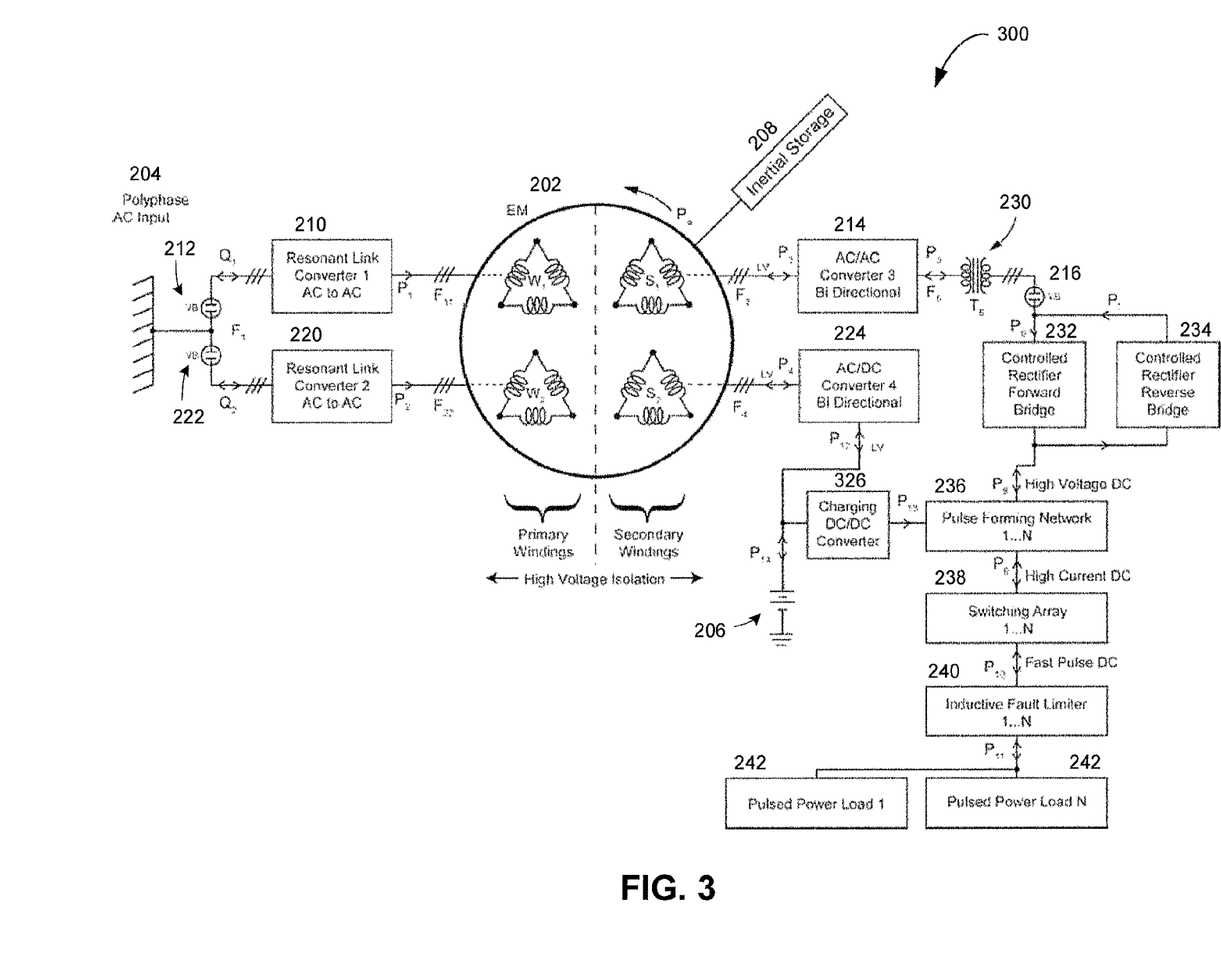
FIG. 3 illustrates another system capable of providing high repetition rate, high voltage pulsed power in accordance with various embodiments of the present disclosure.

FIG. 3 illustrates another system 300 capable of providing high repetition rate, high voltage pulsed power in accordance with various embodiments of the present disclosure. In this illustrative embodiment, the system 300 is an example of one embodiment of the system 200 in FIG. 2 where the electrochemical energy storage system 206 is connected to a charging DC/DC converter 326, which is directly connected to the PFN 236. The charging DC/DC converter 326 delivers power $P_{13}$ in parallel to power $P_8$, which is derived from the EM 202. In various embodiments, during a charging cycle, the electrochemical energy storage system 206 first delivers a constant current energy cycle to the PFN 236 during a period "$T_b$" followed by the EM 202 delivering a constant power energy cycle to the PFN 236 during period $T_{em}$. In this manner, the PFN input energy is divided into two segments which may be arbitrary in power level based on physical differences in the respective energy capacities. In one illustrative example, the energy supplied from the electrochemical energy storage system 206 may be 25% of the total supplied energy and the EM charge can be 75%.

Figure 4:
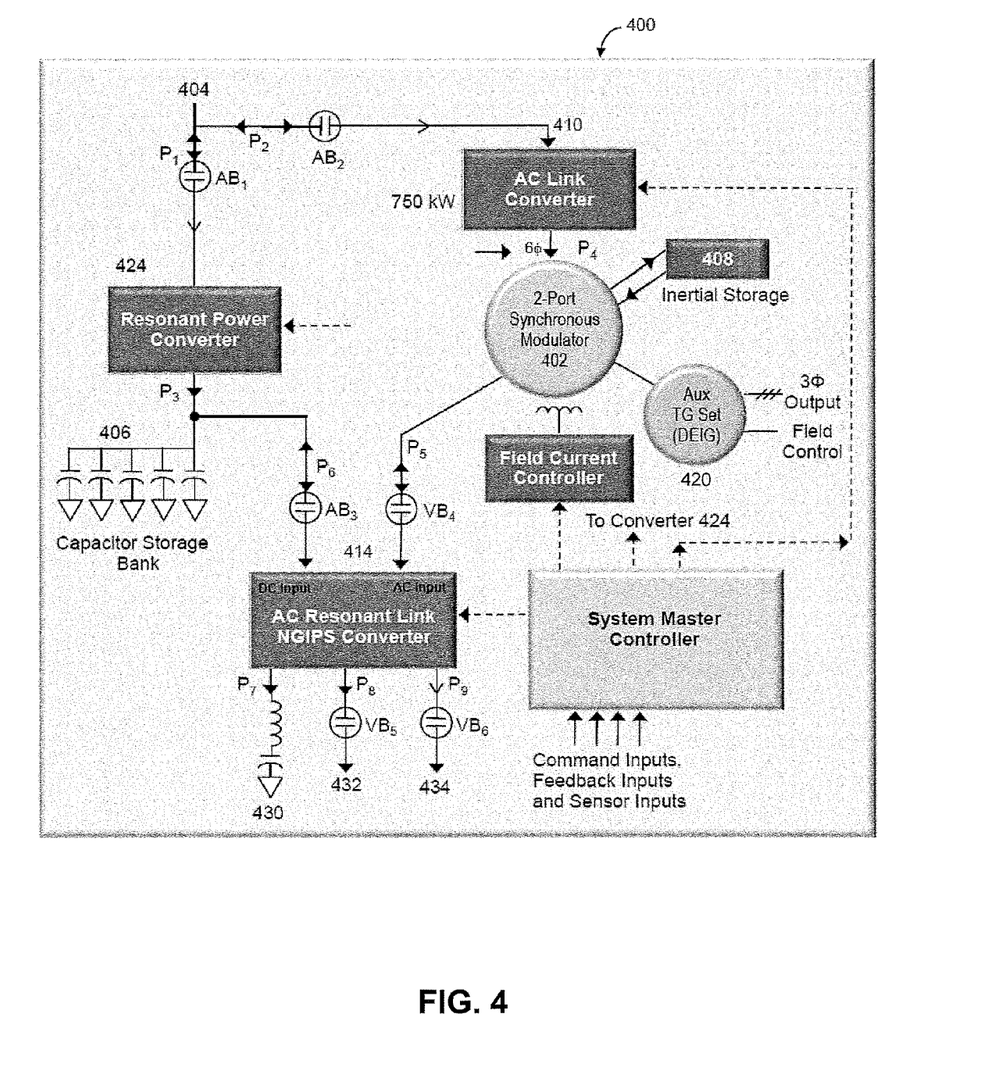
FIG. 4 illustrates a system including a hybrid energy storage system in accordance with various embodiments of the present disclosure.

FIG. 4 illustrates a system 400 including a hybrid energy storage system in accordance with various embodiments of the present disclosure. The system 400 is an example of one embodiment of the system 200 in FIG. 2 where the electrochemical energy storage system 406 can be charged directly from the input energy source 404 and may be made up of, for example, a DC capacitor bank. In this illustrative embodiment, the system 400 includes an inertial energy storage system 408 and a synchronous modulator (SM) 402. As illustrated, the system 400 is capable of powering at least three different types of pulsed power loads at the converter 414. An AC to AC converter 410 powers the SM 402 at a variable frequency to extract energy from the input energy source 404 and accelerates the inertial energy storage system 408 (e.g., a flywheel) at any particular starting speed up to a maximum intended operating speed or energy point. The SM 402 may be connected to an auxiliary generator set 420, which provides low voltage to sub-systems and/or for electric actuation or battery charging. The converter 410 is a bidirectional power converter that converts input source power to accelerate or decelerate the SM 402 according to demands of the system 400. Converter 424 may be an AC to DC resonant link converter that extracts energy from the input energy source 404 and powers the electrochemical energy storage system 406 up to an energy rating point $E_c$. The SM 402 and the electrochemical energy storage system 406 may rapidly exchange power and energy through the converter 414 independent of the main power system.

In this illustrative embodiment, the converter 414 also rectifies or inverts power for at least three different types of independent loads that may include: 1) high voltage DC to a pulsed power load 430 requiring fast rise times and irregular pulsing; 2) medium voltage polyphase AC to a conventional pulsed load 434, such as a phased array radar; and 3) low voltage polyphase AC load 432 for operating a main power distribution bus or a function, such as uninterrupted power (UPS) operations.

In one illustrative example, when both the electrochemical energy storage system 406 and SM 402 are charged to full capacity, the load 430 at $P_7$ may be supplied power first. Once a specific charge is delivered at constant current, the path from the electrochemical energy storage system 406 may be interrupted, and the SM 402 may provide the power through paths $P_5$ and $P_7$. The converter 414 includes two additional outputs at paths $P_8$ and $P_9$ to the low voltage AC load 432 and medium voltage AC load 434, respectively, which may be fed from either the SM 402 for continuous output and/or from the electrochemical energy storage system 406 when limited time duration pulses are desired. The SM 402 also transforms impedance levels since the input energy source 404 may have a high impedance/high inductance, and the loads 430-434 may require a lower impedance/lower inductance source. The lower impedance level generally is beneficial to producing faster pulses and faster charging rates.

In other embodiments, the SM 402 may take the form of a doubly-excited induction generator (DEIG) with an inertial flywheel rather than an SM, whereby the DEIG rotor winding is a polyphase winding and supplied from a controlled variable-frequency polyphase supply to maintain a specific schedule of output current frequency for variable speed operation while the machine is either accelerating or decelerating.

As discussed above, the electrochemical energy storage system 406 includes an electrostatic capacitor array. In various embodiments, the electrostatic capacitor array may employ a non-flammable oil or liquid as a dielectric. Certain new dielectric fluids have an inherently higher dielectric permittivity than mineral oil or synthetic esters that may be used in a capacitor array. For example, dielectric fluids, such as segregated hydro-fluoro-ether (HFE_(e.g., trade name Novec™ 7300 sold by the 3M Company) and non-segregated HFE (e.g., trade name Novec™ 7600 sold by the 3M Company).

The pulsed power DC storage capacitors used in various embodiments of the present disclosure have several characteristics that are demanding and provide specialized design properties. For example, the output pulse duration of the capacitors may be limited to several microseconds or milliseconds. The output current may be high on the order of 10,000 to 200,000 amps per unit. The rate of charging the capacitor array may be high and the time period short (e.g., 100 ms to 5 seconds). The inductance and resistance of the capacitors may need to be kept low to avoid losses on both discharge and discharge. The construction of the capacitors may need to be able to withstand very high current surges without mechanical damage. The capacitors may have a "selfhealing" feature such that internal shorts can be mitigated or cleared in milliseconds. The dielectric material in the capacitors array does not generate excessive amounts of gas during any type of operation or failure as gas can be a potential source of explosion and rupture the containment case. The capacitor array is capable of some level of reverse voltage application, such as 10% reversal, without degradation to the dielectric film or dielectric fluid. Accordingly, embodiments of the present disclosure utilize various dielectric fluids in the capacitor array that have limited outgassing, lower flash points, and significantly more thermally stability than existing dielectric fluids.

Various embodiments of the present disclosure utilize a HFE fluid for the dual purpose of a two-phase coolant flow internal to the main capacitor array in addition to dielectric enhancement. In this embodiment of the electrochemical energy storage system 406, the HFE fluid is vaporized in a closed capacitor container by internal heat generated by both the solid dielectric and the HFE fluid. This vaporized HFE fluid and allowed to condense on a cooling structure inserted into the capacitor container which in turn transfers heat to an external heat exchanger through a system of vanes or tubes containing a secondary heat transfer fluid such as propylene glycol and water (PGW), water, or some other non-HFE fluid that has excellent thermal conductivity. The system 406 may use a thermo siphon effect or a mechanical pump to ensure circulation of the HEE, fluid from the capacitor primary structure to the condenser surface so that two-phase cooling becomes a continuous process and thermal equilibrium is achieved. Different HFE fluids may have has a distinct vapor pressures and the vapor pressure of the employed HFE fluid may become significant with elevated internal temperatures. As a result, the system 406 may include a pressure vessel to contain the HFE fluid to avoid loss of the evaporated HFE fluid. For example, in one embodiment, certain HFEs fluids, such as Novec™ L-21343, have a very low vapor pressure (e.g., 0.133 kPa) and a moderately high heat of vaporization of (e.g., 89 kJ/kg), which may indicate such HFE fluids are suitable for pulsed capacitor use with vaporization cooling.

Figure 5:
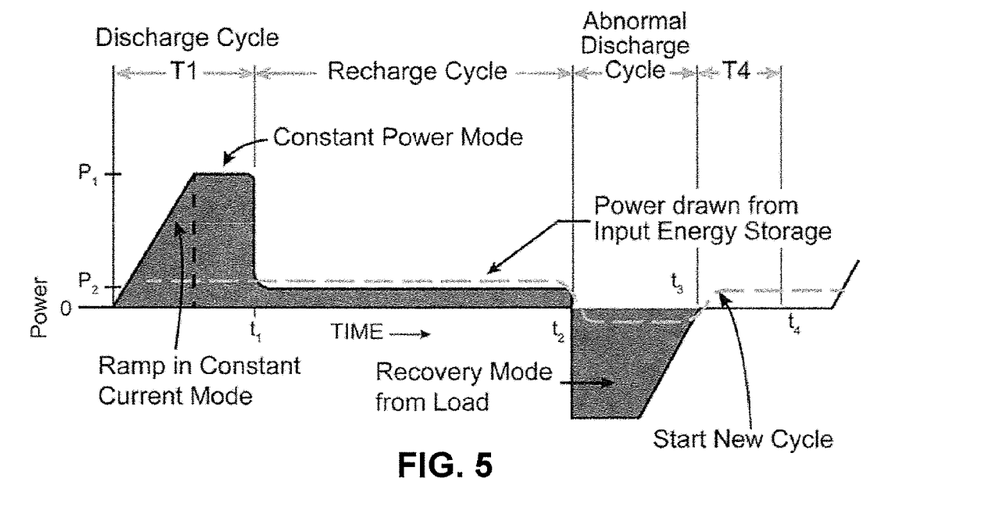
FIG. 5 illustrates a graph of power versus time for one normal pulse forming network (PFN) charge cycle and one abnormal cycle in accordance with an illustrative embodiment of the present disclosure.

FIG. 5 illustrates a graph of power versus time for one normal PFN charge cycle and one abnormal cycle in accordance with an illustrative embodiment of the present disclosure. In this illustrative example, the load energy from a PFN (e.g., PFN 236 in FIG. 2) is regenerated into both electrochemical and inertial energy storage devices (e.g., electrochemical and inertial energy storage devices 206 and 208, respectively, in FIG. 2). A portion of this energy is also regenerated into the input energy source (e.g., input energy source 204 in FIG. 2, a turbine generator, etc.). In the main discharge cycle, energy is ramped first in constant current mode (e.g., from the electrochemical energy storage) up to the P1 power level and then continues at a constant power mode (e.g., from the inertial energy storage) until the end of the period $t_1$ where the energy is discharged into a load.

From $t_1$ to $t_2$, the inertial energy storage is charged by the input source. The output of the input energy source during the period $0$-$t_2$ as shown by the dashed line is nearly constant due to the presence of the SM. This type of charge/discharge cycle may continue indefinitely until there is an abnormal discharge cycle where the power is unused by the load (e.g., a mission abort command) at time $t_2$ for which there is a possibility of returning some level of energy back to the input energy source and majority of energy back to the SM/IES electrochemical and inertial energy storage devices. The regeneration of this PFN energy occurs quickly, for example, on the order of seconds, either to protect the PFN from dielectric damage or to prevent an electrical fault. The electrochemical energy storage is not able to absorb high energy in this period, and the inertial energy storage is the most viable means to hold large quantities of recovered energy. In period from $t_3$ to $t_4$, there is no transfer of energy from the electrochemical or inertial energy storage devices to the PFN, and this is when the input energy source starts the main charge cycle to accelerate the inertial energy storage or slowly charge the electrochemical energy storage.

In various embodiments of the present disclosure, the energy storage and delivery capabilities may be accomplished without electrochemical storage.

Figure 6:
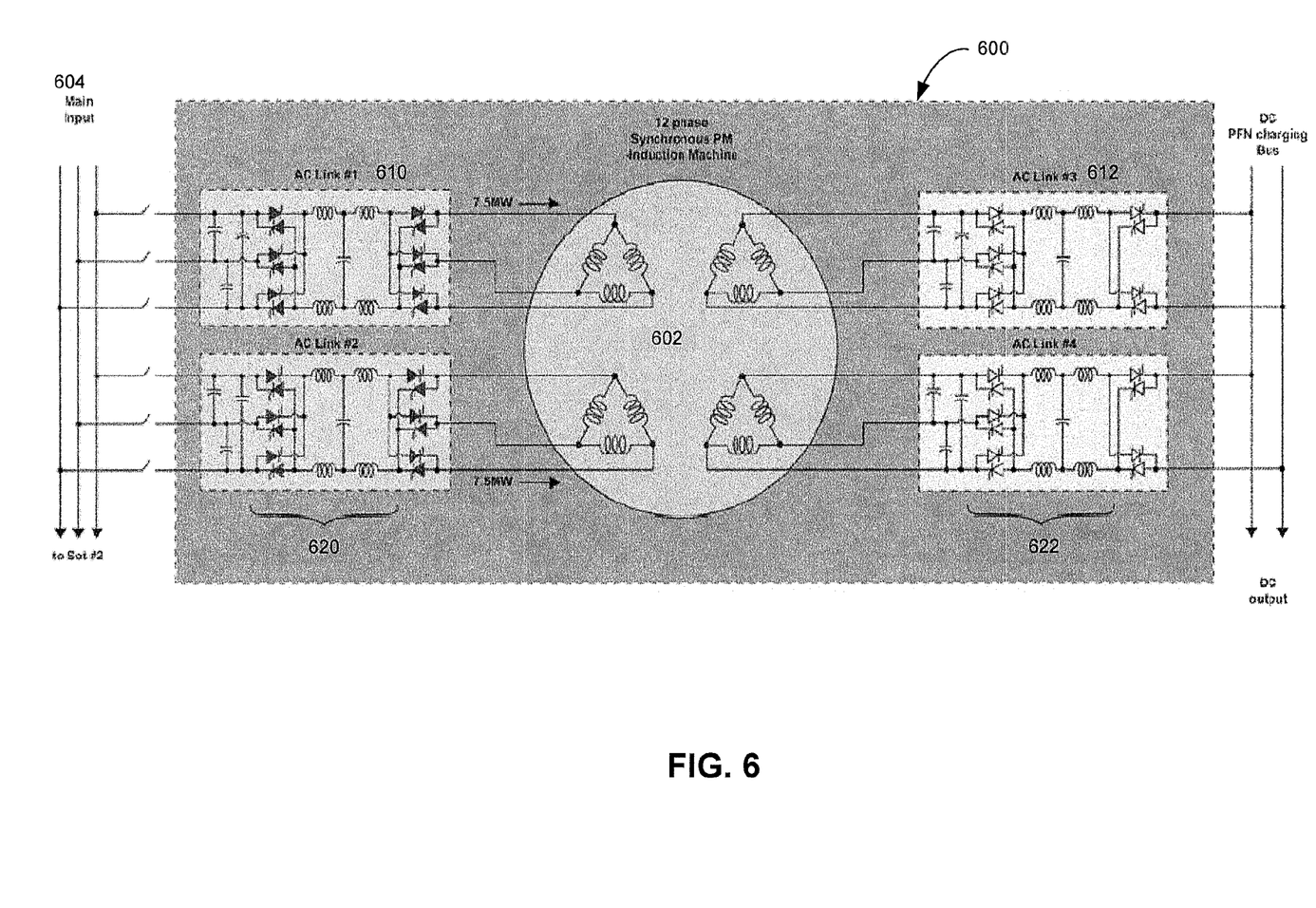
FIG. 6 illustrates a system including a 12-phase bi-directional electrical machine used as a combination energy storage unit and system isolator in accordance with various embodiments of the present disclosure.

FIG. 6 illustrates a system 600 including a 12-phase bi-directional electrical machine used as a combination energy storage unit and system isolator in accordance with various embodiments of the present disclosure. In this illustrative embodiment, the EM 602 may provide a comprehensive energy storage unit and galvanic isolator for the system 600 which receives a medium voltage AC input and provides a high voltage AC or DC output. The AC input 604 may be medium voltage 3-phase input, such as, for example, 4160 Volts or 13.8 kV at either line frequency 60 Hz or a higher frequency, such as 240 Hz. The AC output may be, for example, a high voltage, such as, for example, 22 kV rms to allow charging of a PFN or similar apparatus, which may require high voltage DC at a level of 30 kV or higher.

In various embodiments, the system 600 may accomplish total regeneration of electric energy from the load back to the source by use of AC link power converters 610 and 620 on the input and AC power converters 612 and 622 on the output. For example, the system 600 may be electrically symmetrical about a centerline of the EM 602. The AC link output converters 612 and 622 provide sinusoidal voltage and current from each machine delta-connected output winding. As a result, the AC link output converters 612 and 622 may reduce or minimize harmonic fields in the EM 602 and yield quality power output to the load. The division of input and output windings of the EM 602 into n-multiple 3-phase groups may provide several advantages. As one advantage, this configuration provides redundancy. For example, if one group of windings should fail, the remaining n–1 groups can perform substantial system functions. As a second advantage, the use of multiple input and output converters allows for phase offset of each AC input or output current and, therefore, harmonic quality is improved. The EM 602 may have high galvanic isolation on the order of 75 kV from the input to output side, which may be necessary when protection of the main power system from high-energy transients caused by the PFN load is possible. The input motoring windings are illustrated as connected in a two parallel delta configuration through variable frequency AC link converters 610 and 620 acting as motor drives, and the output of the EM 602 or generating windings are also illustrated in parallel delta groups connected through separate AC link converters 612 and 622 feeding a common DC bus. In this embodiment, bi-directionality for AC link converters 610 and 620 may be used for regeneration (e.g., EM deceleration or recovery of PFN energy) into the incoming line and AC link converters 612 and 622 may be used to absorb load energy and return this to the EM 602.

The EM 602 may include an integral or external inertial storage device that allows the EM 602 to manage input supply line interruptions and the EM 602 to decouple from the line during a high energy burst of the PFN. The input converters 610 and 620 bring the EM 602 to full speed initially. During discharge from full speed to some threshold speed (e.g., 70%), the input converters 610 and 620 are off and energy is strictly supplied by inertia. In various embodiments, the EM 602 is configured to have a low sub-transient and low transient reactance so as to yield a higher energy fast pulse at the output windings. Irrespective of the stator voltage level, the output reactances of the EM 602 may be relatively low. In one illustrative example, with a 22 kV output, the sub-transient reactance can be 4.5%, and the transient reactance can be 12%. For a 5 MVA rated machine output at 22 kV rms line to line, the peak output current is 2916 Amps rms, and the short circuit apparent power is 111 MVA. With a typical totally-offset output wave, the peak current is 4811 amps. The load PFN, even with DC rectification, has high frequency harmonics at about 30 kHz, which impinges on the output windings of the EM 602. However, according to the embodiments of the present disclosure, these high frequency transients may not adversely affect the primary windings due to the machine galvanic and magnetic isolation. In these embodiments, capacitors or capacitor arrays in the PNF, the AC link power converters 610 and 620 on the input and/or AC power converters 612 and 622 on the output may include the use of a liquid dielectric, such as an HFE liquid shown and described in connection with the electrochemical energy storage system 406 in FIG. 4.

Figure 7:
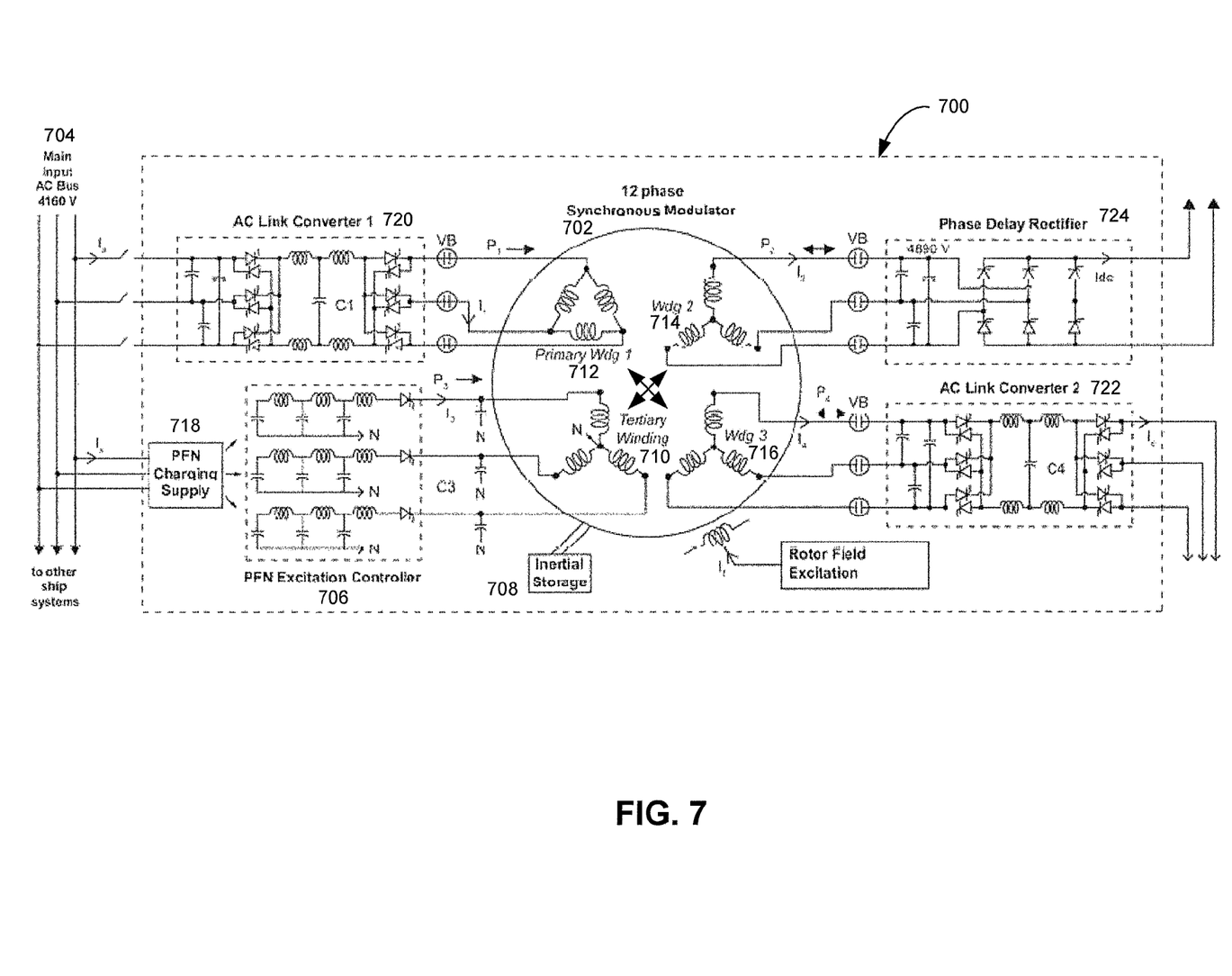
FIG. 7 illustrates a system including a 12-phase electrical machine in accordance with various embodiments of the present disclosure.

FIG. 7 illustrates a system 700 including a 12-phase electrical machine in accordance with various embodiments of the present disclosure. In this illustrative embodiment, the EM 702 may be a synchronous modulator with an-inertial energy storage device 708. The system 700 utilizes three phases for input power, three output phases for rectification to a high voltage pulsed power system, three phase output to medium voltage pulsed loads, and three phase input from a PFN excitation controller 706 to stator tertiary excitation winding 710, which allows for fast ramping rates for output power. The system 700 has a dual mode excitation scheme to provide normal excitation (e.g., rotor field 250 VDC circuit or "steady DC excitation") for slowly changing loads (e.g., normal service loads, HVAC compressors, etc.) and a fast excitation circuit (e.g., for loads requiring large pulses of energy, such as railgun, radar, or laser weapon loads) using the stator tertiary winding 710.

The converter 720 provides input 3-phase power to winding 712 from an input power source 704. The winding 714 has a 3-phase output to converter 722 for medium voltage (e.g. 4160 Volt) pulsed loads. The winding 716 has three output phases for rectification to a high-voltage pulsed power system via phase delay rectifier 724 and has a 3-stage input from a high rate of the PFN excitation controller 706 to the stator tertiary excitation winding 710, which creates fast ramp rates for output power. As illustrated, the PFN excitation controller 706 receives an input from PFN charging supply 718. The PFN charging supply 718 may include an electronic switching mechanism, such as insulated-gate bipolar transistor (IGBT) devices or thyristors, to stagger inputs to the three parallel paths supplying excitation energy to the stator tertiary excitation winding 710. This staggered input produces a polyphase output of the stator tertiary excitation winding 710 with fast rates of ramping up power to the pulsed high power loads. The pulsed DC and steady state DC excitation modes may not be used simultaneously, as they have widely different time constants, which can differ by design by a factor of two orders of magnitude. All four stator windings 710-716 may be built on a common stator magnetic core although, in some embodiments, each winding has a different applied or generated voltage, different current levels, and different time constants. The system 700 constitutes an excitation scheme for a multi-purpose synchronous modulator IES which can accommodate both slow and fast changing load energy requirements. In these embodiments, capacitors or capacitor arrays in the PFN excitation controller 706, the AC link converter 720, the AC link converter 722, and/or the phase delay rectifier 724 may include the use of a liquid dielectric, such as an HFE liquid shown and described in connection with the electrochemical energy storage system 406 in FIG. 4.

Figure 8:
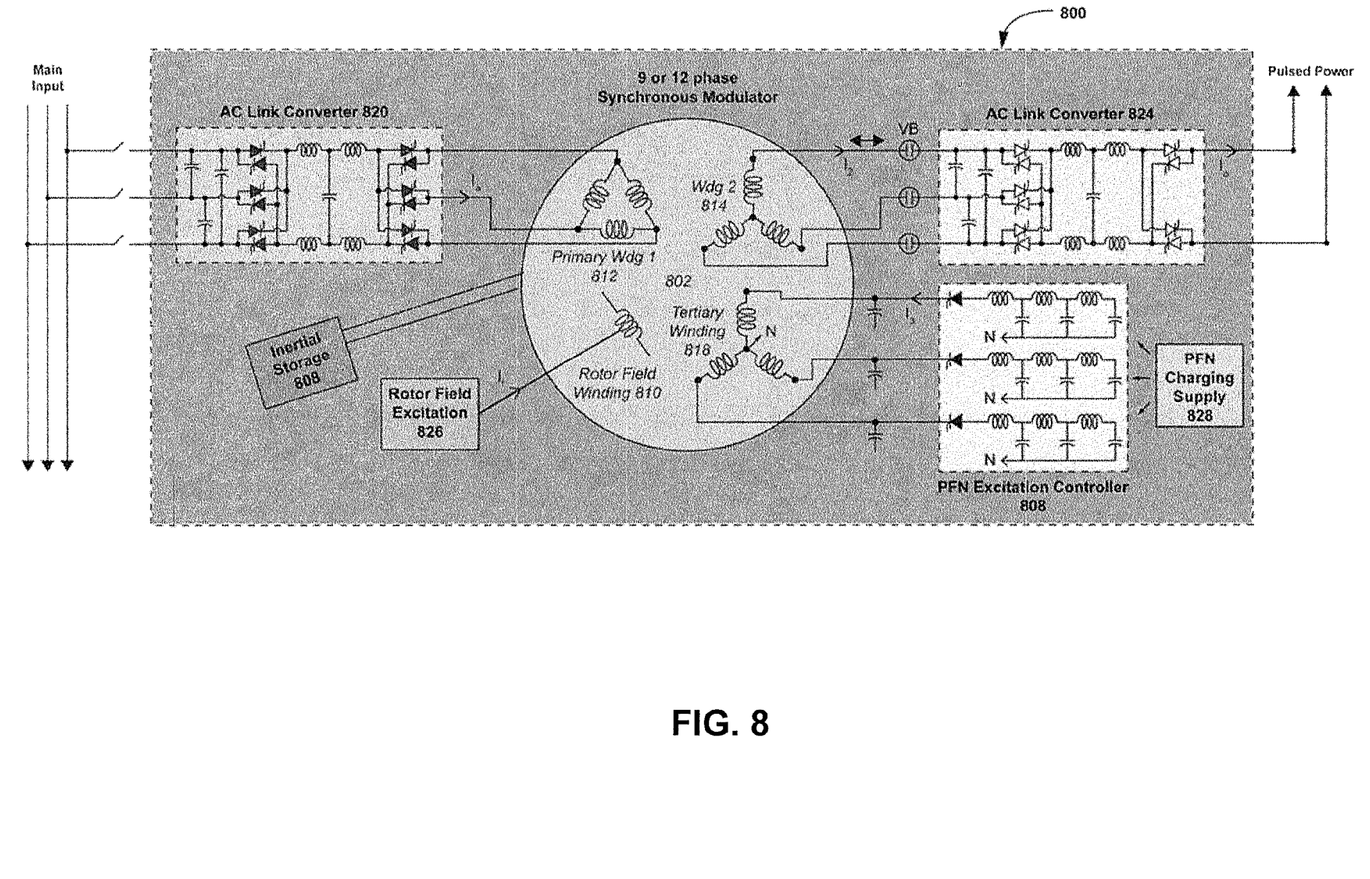
FIG. 8 illustrates a system including a 9-phase electrical machine in accordance with various embodiments of the present disclosure.

FIG. 8 illustrates a system 800 including a 9-phase electrical machine in accordance with various embodiments of the present disclosure. In this illustrative embodiment, the EM 802 is a 9-phase synchronous modulator with an inertial energy storage device 808 and a rotor field excitation 826 for excitation of the rotor field winding 810. The system 800 has stator windings including a 3-phase input winding 812, one output 3-phase winding 814 for high voltage pulsed power loads, and a 3-phase input from a pulsed DC excitation to stator tertiary winding 818 to allow for fast ramp rates for output power. The AC link converters 820 and 824 are bi-directional in power and energy flow and allow the output power to be generated at a higher frequency than the input frequency prior to rectification for supplying PFNs or DC loads.

The PFN excitation controller 806 for the tertiary winding is an example of one embodiment of the PFN excitation controller 706 in FIG. 7. Each of the three phases in the PFN excitation controller 806 has a 3 stage L-C PFN which creates a set of fast AC pulses in current $i_3$ which are spaced about 120 degrees apart when applied to the EM 802. A thyristor or similar solid state switch is included in each PFN excitation circuit to control the timing of each PFN circuit in relation to the next and act as an isolator switch. Although the PFN is charged with a DC supply 828, the PFN circuit in conjunction with the machine winding inductance is a resonant circuit, and the output pulses are alternating in polarity, often with exponentially decreasing amplitude, and thus, constituting a traveling wave of excitation magneto-motive force (MMF). In the most general case, there are n stages of PFN excitation circuits, and the output pulses are spaced 360/n degrees apart in phase. For example, the system 800 may have a rise time of about 50 microseconds or less and may cause the MMF of the EM 802 to increase to full strength in less than 1 millisecond, which is an order of magnitude faster than conventional rotor DC excitation. This method of quickly ramping the rotating machines excitation further advances the synchronous modulator for high energy pulse regulation due to the needs for fast energy regulation and recovery with power slew rates, for example, such as 20 MW/s. In these embodiments, capacitors or capacitor arrays in the PFN excitation controller 808, the AC link converter 820, and/or the AC link converter 824 may include the use of a liquid dielectric, such as an HFE liquid shown and described in connection with the electrochemical energy storage system 406 in FIG. 4.

Figure 9:
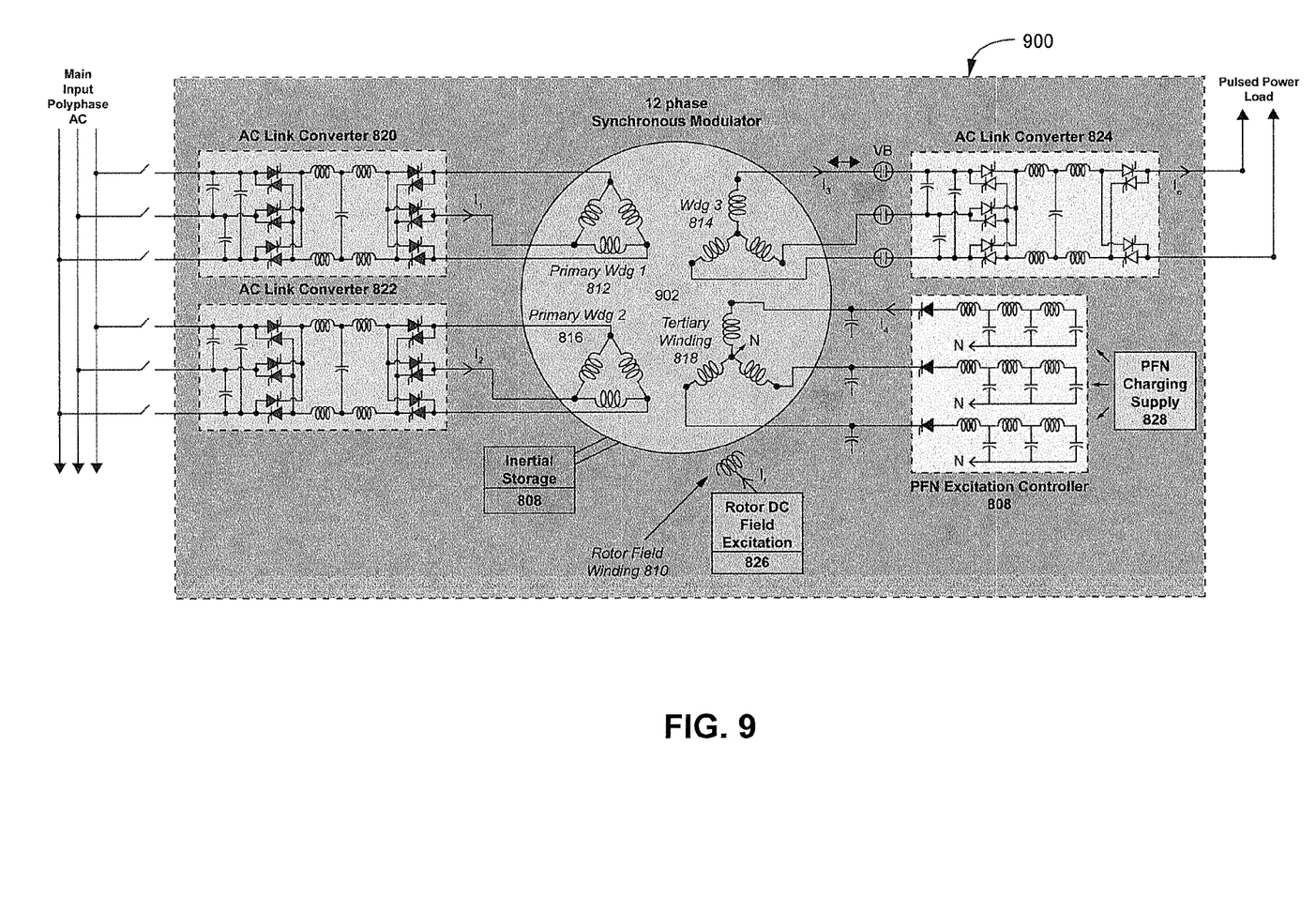
FIG. 9 illustrates a system including a 12-phase electrical machine in accordance with various embodiments of the present disclosure.

FIG. 9 illustrates a system 900 including a 12-phase electrical machine in accordance with various embodiments of the present disclosure. In this illustrative embodiment, the system 900 is an example of one embodiment of the system 800 in FIG. 8 where the system 900 includes a 12-phase electrical machine. In this illustrative embodiment, the system 900 includes a multiplicity (e.g., two) of input power converters (i.e., AC link converters 820 and 822). The EM 902 is a 12-phase synchronous modulator with stator windings including the 3-phase input winding 812, a 3-phase input winding 816, the output 3-phase winding 814 for high voltage pulsed power loads, and the 3-phase input from a pulsed DC excitation to stator tertiary winding 818 to allow for fast ramp rates for output power.

Figure 10:
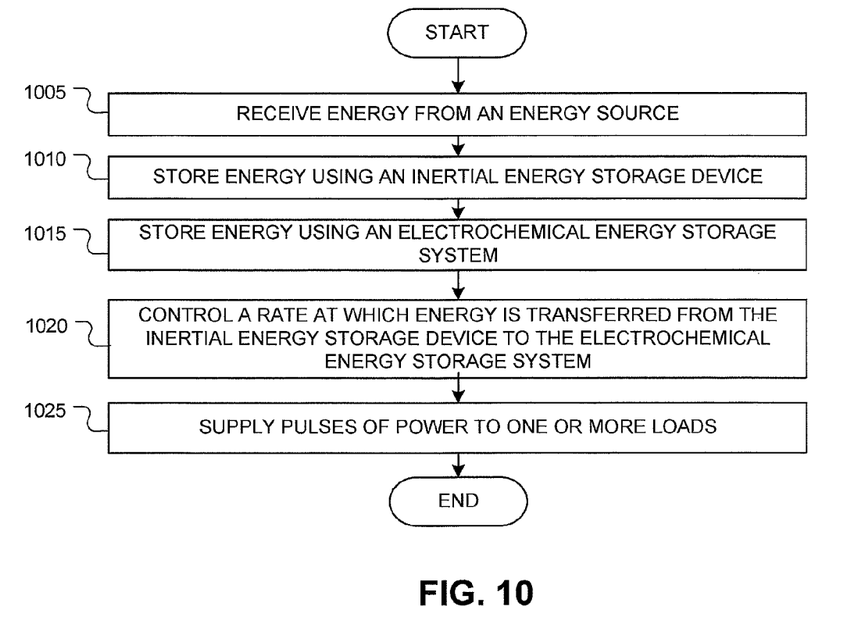
FIG. 10 illustrates a flowchart of a process for supplying pulsed power in accordance with various embodiments of the present disclosure.

FIG. 10 illustrates a flowchart of a process for supplying pulsed power in accordance with various embodiments of the present disclosure. The process illustrated in FIG. 10 may be performed by the energy transfer system 100 in FIG. 1 or any of the systems 200-700 in FIGS. 2-7.

The process begins with the system receiving energy from an energy source (step 1005). For example, in step 1005, the system may be configured to receive energy from one or a plurality of input power sources. The system then stores energy using an inertial energy storage device (step 1010). For example, in step 1010, the system may store inertial energy in an EM and/or SM using an inertial energy storage device, such as a flywheel.

The system stores energy using an electrochemical energy storage system (step 1015). For example, in step 1015, the system may directly transfer energy from the energy source to the electrochemical energy storage system. In another example, the system may charge the electrochemical energy storage system using the EM and/or may transfer energy that was unused by the one or more loads (e.g., from an aborted mission). In addition, the system controls a rate at which energy is transferred from the inertial energy storage device to the electrochemical energy storage system (step 1020). For example, in step 1020, the system may control the charging of the electrochemical energy storage system based on a prescribed charging rate for the electrochemical energy storage system. The system may buffer or protect the electrochemical energy storage system from overheating due to charging quicker than the electrochemical energy storage system can safely accommodate.

The system supplies pulses of power to one or more loads (step 1025). In step 1025, the system uses the energy stored by the electrochemical and/or inertial energy storage systems to generate pulses of power using, for example, one or more PFNs that may be positioned on either the input or output sides of the EM. In one embodiment, the EM may be a synchronous modulator electrical machine comprising a stator tertiary winding having an input from a polyphase pulsed excitation system, such as the PFN excitation controller 706 in FIG. 7. Additionally, the system may also supply transient power to one or more loads at lower voltages than the high-voltage pulses.

Although FIG. 10 illustrates an example of a process for supplying pulsed power, various changes could be made to FIG. 10. For example, while shown as a series of steps, various steps in the process could overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A pulse power supply system comprising:
an inertial energy storage device configured to store inertial energy;
an electrochemical energy storage system configured to store electrochemical energy; and
a bidirectional energy transfer system configured to:
receive energy from one or more input power sources;
transfer at least a portion of the received energy to the inertial energy storage device;
transfer at least a portion of the received energy in the inertial energy storage device to the electrochemical energy storage system while controlling a rate at which energy is transferred to the electrochemical energy storage system based on a prescribed charging rate associated with the electrochemical energy storage system; and
supply pulses of power to one or more loads using the stored energy.

2. The pulse power supply system of claim 1, wherein the bidirectional energy transfer system comprises a synchronous modulator bidirectional electrical machine.

3. The pulse power supply system of claim 2, wherein the synchronous modulator bidirectional electrical machine comprises a tertiary stator winding for machine excitation and voltage control having an input from a polyphase pulsed excitation system.

4. The pulse power supply system of claim 1, wherein the bidirectional energy transfer system is configured to directly transfer energy from an energy source to the electrochemical energy storage system.

5. The pulse power supply system of claim 1, wherein the bidirectional energy transfer system is configured to transfer energy that is unused by the one or more loads to the inertial energy storage device and, after a time delay, transfer a portion of the energy from the inertial energy storage device to the electrochemical energy storage system.

6. The pulse power supply system of claim 1, wherein the bidirectional energy transfer system comprises a pulse forming network configured to supply the pulses of power to the one or more loads with multiple time constraints using the stored energy.

7. The pulse power supply system of claim 1, wherein the bidirectional energy transfer system comprises multiple power outputs, the bidirectional energy transfer system configured to supply pulses of steady-state power to a first load and supply transient power to a second load having a different electrical characteristic impedance or different time constraint.

8. The pulse power supply system of claim 1, wherein the electrochemical energy storage system comprises an electrostatic capacitor array configured to store the electrochemical energy.

9. The pulse power supply system of claim 8, wherein the electrostatic capacitor array includes a nonflammable liquid dielectric.

10. The pulse power supply system of claim 9, wherein the nonflammable liquid dielectric is a hydro-fluoro-ether liquid dielectric.

11. A method for supplying pulsed power, the method comprising:
receiving energy from an energy source;
transferring at least a portion of the received energy to an inertial energy storage device to store inertial energy;

transferring at least a portion of the received energy to an electrochemical energy storage system while controlling a rate at which energy is transferred to the electrochemical energy storage system based on a prescribed charging rate associated with the electrochemical energy storage system to store electrochemical energy; and supplying pulses of power to one or more loads using the stored energy.

12. The method of claim 11 further comprising:
generating the pulses of power using a synchronous modulator electrical machine comprising a tertiary stator winding having an input from a polyphase pulsed excitation system.

13. The method of claim 11, wherein transferring at least the portion of the received energy to the electrochemical energy storage system comprises directly transferring the energy from the energy source to the electrochemical energy storage system.

14. The method of claim 11, wherein transferring at least the portion of the received energy to the electrochemical energy storage system comprises transferring energy that is unused by the one or more loads to the electrochemical energy storage system.

15. The method of claim 11, further comprising:
receiving energy from a plurality of input power sources; and
supplying transient power to the one or more loads.

16. A synchronous modulator electrical machine comprising:
a primary stator winding having an input configured to couple to one or more input Dower sources;
a secondary stator winding having an output configured to provide output power to one or more pulsed loads;
a third stator winding having an output configured to couple to a phase delay rectifier for rectification of output power to a high-voltage pulsed power system; and
a tertiary stator winding having an input configured to couple to a polyphase pulsed excitation system, the tertiary stator winding configured to provide pulsed direct current excitation to the third stator winding in the synchronous modulator electrical machine.

17. The synchronous modulator electrical machine of claim 16, further comprising:
a rotor configured to provide steady state direct current excitation in the synchronous modulator electrical machine.

18. A system comprising the synchronous modulator electrical machine of claim 16 and further comprising:
the polyphase pulsed excitation system operably connected to the tertiary stator winding;
an inertial energy storage device configured to store inertial energy and operably connected to the synchronous modulator electrical machine;
an electrochemical energy storage system configured to store electrochemical energy and operably connected to the synchronous modulator electrical machine; and
a bidirectional energy transfer system configured to:
receive energy from an energy source;
transfer at least a portion of the received energy to the inertial energy storage device;
transfer at least a portion of the received energy to the electrochemical energy storage system while controlling a rate at which energy is transferred to the electrochemical energy storage system based on a prescribed charging rate associated with the electrochemical energy storage system; and
supply power to at least one of the one or more pulsed loads and the high-voltage pulsed power system using the stored energy.

19. The system of claim 18, wherein the bidirectional energy transfer system comprises the synchronous modulator bidirectional electrical machine.

20. The system of claim 18, wherein the bidirectional energy transfer system is configured to directly transfer energy from the energy source to the electrochemical energy storage system.

21. The system of claim 18, wherein the bidirectional energy transfer system is configured to transfer energy that is unused by the one or more loads to the inertial energy storage device and, after a time delay, transfer a portion of the energy from the inertial energy storage device to the electrochemical energy storage system.

22. The system of claim 18, wherein the bidirectional energy transfer system comprises a pulse forming network configured to supply pulses of power to the one or more loads using the stored energy.

23. The system of claim 18, wherein the bidirectional energy transfer system comprises multiple power outputs, the bidirectional energy transfer system configured to supply pulses of steady-state power to a first load and supply transient power to a second load having a different electrical characteristic impedance or different time constraint.

* * * * *